United States Patent [19]

Gamberini

[11] Patent Number: 4,858,770
[45] Date of Patent: Aug. 22, 1989

[54] EXIT STAGE DEVICE FOR A PACKAGING LINE

[75] Inventor: Antonio Gamberini, Bologna, Italy

[73] Assignee: G.D. Società per Azioni, Bologna, Italy

[21] Appl. No.: 54,770

[22] Filed: May 27, 1987

[30] Foreign Application Priority Data

May 27, 1986 [IT] Italy ................................ 3428 A/86

[51] Int. Cl.⁴ .............................................. B07C 5/00
[52] U.S. Cl. ........................................ 209/535; 53/53; 198/457
[58] Field of Search ................... 198/457, 464.2, 478.1, 198/502.1, 502.3; 209/535, 536; 53/53; 131/907/908

[56] References Cited

U.S. PATENT DOCUMENTS 2,922,519 1/1960 Radley ...................................... 53/53
3,899,863 8/1975 Seragnoli et al. ........................ 53/53

FOREIGN PATENT DOCUMENTS 2452117 11/1980 France ................................ 198/502.1
2134870 8/1984 United Kingdom ..................... 53/53
2140268A 11/1984 United Kingdom .

Primary Examiner—William L. Freeh
Attorney, Agent, or Firm—Cushman, Darby & Cushman

[57] ABSTRACT

The device disclosed is intended for the exit stage of a packaging line, in particulr a line for the manufacture of packs of cigarettes, in which an exit conveyor indexes a continuous string of packs toward respective pockets created in an indexing transfer wheel that rotates about an axis parallel to the path of movement established by the conveyor. The transfer wheel and the conveyor are both driven from one motor, the wheel via a direct transmission link, and the conveyor via a differential operated by a transducer that serves to establish the exact position occupied by each single pack in relation to the transfer wheel on arrival at a reference point situated in the path followed along the conveyor toward the wheel.

8 Claims, 2 Drawing Sheets

EXIT STAGE DEVICE FOR A PACKAGING LINE

BACKGROUND OF THE INVENTION

The invention relates to an exit stage device for a packaging line.

More exactly, the invention relates to an exit stage device in a cigarette production line, of the type comprising a conveyor in receipt of finished packs from a wrapping wheel and designed to transfer such packs, proceeding face-to-face substantially in mutual contact one with the next, to a draw-off mechanism that removes the packs from the conveyor singly in succession and directs them toward a downstream machine.

In packaging machinery, the draw-off mechanism for removal of packs from a conveyor as mentioned above is embodied conventionally as an actuator, for example, a rotary actuator such as that disclosed in commonly assigned U.S. No. 3,899,863, which is located at the exit end of the conveyor and designed to remove the packs singly and in succession, carrying them away at right angles to the path established by the conveyor in order to effect their transfer, say, to a further conveyor.

Actuators of the conventional type mentioned above are beset by the drawback of not permitting accurate positional control on the packs in transfer, a fact which renders it almost impossible to effect quality control operations; such operations would in fact be best implemented on the packs during this transfer, seeing that practically no possibility exists of their being effected during passage of the packs along the conveyor, sandwiched together.

Accordingly, the object of the invention is to embody a device for the exit stage of a packaging line of the type outlined above, which affords the facility of implementing quality controls on the packs with ease during the course of their being transferred from the conveyor to a further machine or station farther down the production line.

SUMMARY OF THE INVENTION

The stated object is amply realized with a device according to the invention. Such a device, intended in particular for inclusion in a production line turning out packs of cigarettes, is of the type comprising a conveyor in receipt of a file of packs which it indexes forward along a predetermined path, sandwiched together side by side substantially in mutual contact one with the next, transfer means located at the exit end of the conveyor and designed to remove the packs from the conveyor singly and in regular succession, shifting them in a direction transverse to the path established by the conveyor, and drive means for operation of the conveyor and the transfer means.

In the device disclosed, transfer means take the form of a wheel having a plurality of peripheral pockets, each one of which designed to accommodate a respective pack, and rotatable about an axis lying substantially parallel with the path established by the conveyor in such a way that the drive means can index the peripheral pockets successively into alignment with the exit end of the path established by the conveyor.

A device according to the invention further comprises means for detection of the exact position occupied by each pack in relation to the transfer wheel on arrival at a reference point situated along the path established by the exit conveyor, and a differential, installed between the conveyor and the drive means and having two inputs, one of which connected to the drive means, the other to a motor which is operated by the detection means through the agency of a control circuit.

BRIEF DESCRIPTION OF THE DRAWINGS

The invention will now be described in detail, by way of example, with the aid of the acompanying drawings, in which.

DESCRIPTION OF THE PREFERRED EMBODMIENTS

Figure 1:
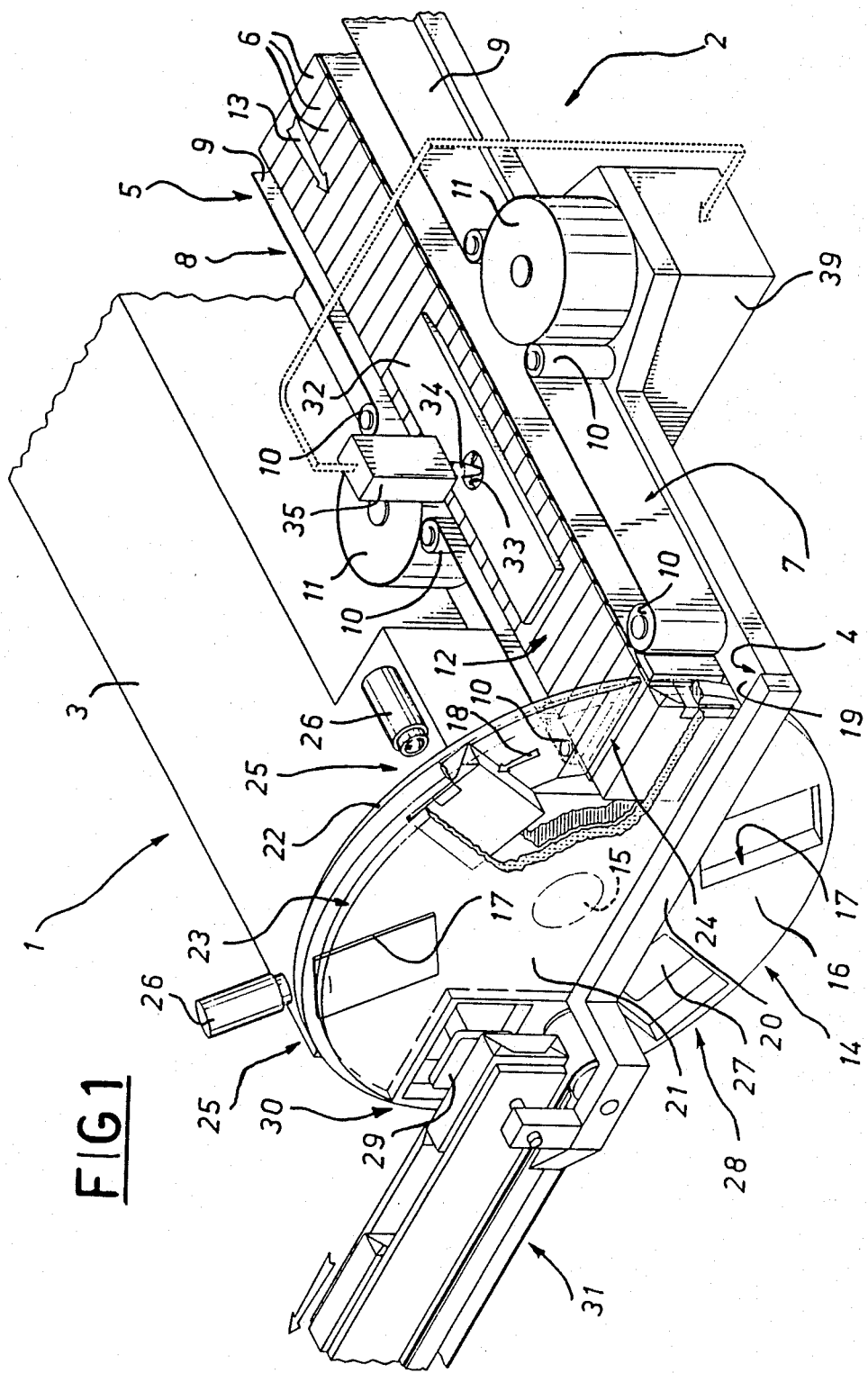
FIG. 1 is a perspective, schematically represented, of a packaging machine exit stage device embodied according to the invention.

In FIG. 1 of the above drawings, 1 denotes a cigarette packaging machine in its entirety, one part of which only is illustrated. The part in question consists in an exit stage device 2, which includes a frame 3, and a table 4 projecting from the frame; the table 4 is substantially horizontal, and supports an exit conveyor 5 extending along its length and carrying packs of cigarettes 6.

The exit conveyor 5 comprises two belt drives 7 and 8 the belt 9 of each one of which is looped around a respective plurality of vertical guide rollers 10 and a relative drive roller 11; thus, a channel 12 is created between the two belts 9 either side and the surface of the table 4 beneath, along which the packs 6 are indexed in mutual contact one with the next in the direction indicated by the arrow 13.

14 denotes a transfer and knock-out wheel that is positioned with one face offered to the table 4 at the exit end of the conveyor 5, considered in relation to the direction of the arrow 13, keyed to a drive shaft 15 journalled to the machine frame 3, and disposed with its axis parallel to the direction of the arrow 13.

The wheel 14 constitutes transfer means that serve to remove packs 6 from the conveyor 5, and is embodied substantially as a flat disk 16 keyed to the drive shaft 15 and provided with a plurality of peripheral pockets, or windows 17, spaced apart at identical distances one from the next around the shaft and exhibiting shape and dimensions that substantially match the sectional shape and dimensions of a single pack 6, considered in a plane lying at right angles to the direction of the arrow 13. The disk 16 is indexed by the shaft 15, rotating in the direction of the arrow denoted 18 through angular divisions equal to the distance between centers of any two adjacent windows 17; moreover, the distance from the central point of each window 17 to the axis of the drive shaft 15 is identical to the distance between the shaft 15 and the longitudinal median axis of the channel 12. Accordingly, with the disk 16 initially occupying an angular position such that one of the windows 17 is offered to the exit end of the channel 12, each division subsequently indexed will bring another window 17 into alignment with the exit end of the channel 12.

19 denotes an appendage that is located beyond the periphery of the disk 16 and projects axially from the end of the table 4 lying adjacent to the exit of the channel 12; attached to the projecting end of the appendage 19 and extending horizontally in a direction transverse to that of the arrow 13, one has a rail 20 breasted with the surface of the disk 16 opposite that offered to the frame 3. The rail 20 and the frame 3 carry respective baffles 21 and 22 positioned one at either side of the disk 16 and screening substantially that part of the disk which projects above the surface of the table 4. The two baffles 21 and 22 thus create a substantially semiannular chase 23 encircling the drive shaft 15, the width of which, considered in the direction of the arrow 13, is substantially equal to the width of a single pack 6.

The baffle denoted 22 exhibits a window 24 of shape and dimensions substantially identical to those of the windows 17 in the disk 16; the window 24 in question is positioned facing the channel 12 and affords access to the chase 23.

The semiannular chase 23 extends through a plurality of work stations; these include quality control stations generically denoted 25 (of which two only are illustrated) each of which comprises sensing means, generically denoted 26, designed to detect a given set of characteristics of the single pack 6 and, where appropriate, to trigger operation of the knock-out actuator 27 of a reject station 28 located in alignment with the periphery of the disk 16 at a point below the rail 20, and to inhibit operation of the actuator 29 of a transfer station denoted 30.

The transfer station 30 is located in alignment with the periphery of the disk at a point diametrically opposite the access window 24, facing the entry end of an outgoing conveyor 31 that runs in a direction substantially at right angles to that of the arrow 13 and is supported by the rail 20; the entry end of the outgoing conveyor 31 faces the surface of the disk 16 opposite that facing the frame 3.

Figure 2:
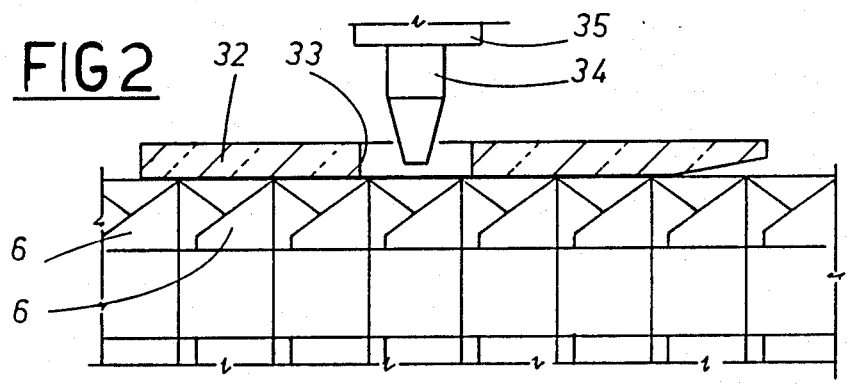
FIG. 2 illustrates a detail of FIG. 1, viewed in section and on larger scale.

The embodiment shown in FIG. 1 comprises a pressure plate 32, illustrated in detail in FIG. 2, positioned lengthwise along the channel 12 and in contact with the upward-facing sides of a given number of the packs 6 occupying the channel. Such a plate 32 will be supported by the machine frame 3 (in a manner not illustrated), and exhibit a through hole 33 with which conventional detection means 35 are positioned in coaxial alignment, installed above the level of the plate 32 and carried by the frame 3, likewise in a manner not actually shown in the drawings. In the example illustrated in FIGS. 1 and 2, such detection means are embodied as a pneumatic transducer having a nozzle 34 that is designed to direct a continuous jet of air through the hole 33 at the upward-facing surfaces of the packs 6 in such a way that a rebound pressure wave can be propagated back along the jet into the body of the transducer 35, and measured.

Practical experiment has demonstrated that, when a continuous jet of air directed through the hole 33 collides with a string of packs 6 moving across the table 4, following the path defined by the channel 12, the level of the aforementioned rebound pressure varies periodically, remaining positive throughout, but shifting between a minimum value that reflects the moment when the jet hits a join between adjacent packs 6, and a maximum peak that occurs when the jet impinges exactly on the transverse median axis of the upward-facing surface of a pack passing beneath.

Figure 3:
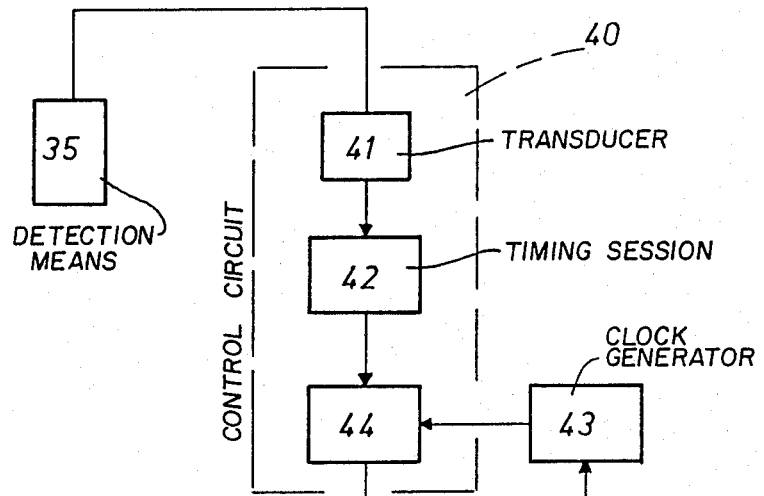
FIG. 3 is a block diagram of the device of FIG. 1.

This type of response is repeated precisely with the passage of each single pack 6 beneath the hole 33, and can thus be utilized by the device 2 disclosed for monitoring progress of the string of packs along the conveyor 5, as illustrated in the block diagram of FIG. 3.

With reference to FIG. 3, the drive shaft 15 turning the disk 16 and the rollers 11 driving the belts 7 and 8 are both in receipt of power transmitted from a main drive system, namely the motor 36 of the packaging machine 1. The motor 36 connects with the drive shaft 15 via a direct transmission link (not illustrated), whereas connection to the rollers 11 is effected by way of a differential 37.

Such a differential 37 might be of the type, for instance, disclosed in U.S. Pat. No. 4,598,719 issued July 8, 1986, and has two inputs, the first of which is connected to the output of the main motor 36, the second connected to the output of a stepping motor 38 accommodated in a housing 39 (see FIG. 1) located below the level of the table 4 in a central position.

The stepping motor 38 is provided with a control circuit 40 that comprises a transducer 41 designed to convert the signal from the detection means 35 into an electrical signal, a timing sensor 42, and a clock generator 43 connected to the main motor 36. In the example illustrated, where detection means 35 are pneumatic 35, the transducer 41 of the control circuit 40 is electropneumatic, and emits a signal proportionate to the rebound pressure sensed by the pneumatic transducer 35, whilst the timing sensor 42 is designed to respond by emitting a signal at the instant when peak rebound pressure occurs -i.e. each time the upward-facing surface of a single pack 6 is struck centrally by the air jet from the nozzle 34. The clock generator 43 is designed to emit a signal for reference purposes, at the nominal instant in which a single pack 6 should be centrally aligned below the nozzle 34 if it is to coincide correctly with one of the windows 17 in the transfer wheel on reaching the end of the conveyor 5.

The stepping motor control circuit 40 also comprises a comparator 44, the inputs of which are in receipt of the signals from the timing sensor 42 and the generator 43; the output signal from the comparator to the stepping motor 38 is proportional in absolute value and in plus or minus status to the difference between its two timing input signals, and designed to operate the motor 38 in such a way that any such difference is eliminated.

Operation of the device will now be described. Packs 6 are indexed along the channel 12 toward the transfer and knock-out wheel 14, proceeding forward in single file sandwiched in contact one with the next. Each step indexed is substantially equal to the depth of a single pack 6 so that, in theory, each single pack 6 will locate in a relative window 17 of the transfer wheel 14 on arrival at the exit end of the channel 12, whereupon the disk 16 is indexed through one division in order to remove the pack 6 from the channel and take it through the various quality control stations 25 to the transfer station 30.

The pack 6 will be subjected to a different quality control at each station 25, and where all controls give positive results, the actuator 29 will operate at the transfer station 30 so as to direct the pack 6 onto the outgoing conveyor 31. In the event of any one control giving a negative result, on the other hand, operation of the transfer actuator 29 will be inhibited, in which case the defective pack will be indexed by the disk 16 beyond the transfer station 30 round to the reject station 28, and there removed by a stroke of the knock-out actuator 27.

Operation of the device 2 as described thus far is purely theoretical. In practice, the single packs 6 will not always be indexed with absolute precision by the conveyor 5 in such a way as to reach the end of the channel 12 and slot faultlessly into a given window 7 without operation of the control circuit 40 being triggered. A number of factors contribute to such a lack of precision, for instance, momentary loss of grip between the packs 6 and the belts 9 of the two drive loops 7 and 8, or marginal dimensional variations from one pack to another attributable to the properties of the wrapping material and/or to environmental conditions (variations in relative humidity etc.). Without correction from the control circuit 40, the effect of such influences as these would be that, within a short interval, each step indexed by the conveyor 5 would find a pack 6 either only part-located in the relative window 17, or alternatively, urged against the far baffle 21 with too great a force, sufficient in some instances to occasion partial entry of the next pack behind into the same window 17.

Whatever the particular circumstance, failure of a pack 6 to locate correctly in a relative window 17 will result in damage occurring either to that same pack 6 or to the pack next in line, since the subsequent indexing motion of the disk 16 will crush it against the edge of the access window 24 in the baffle 22. The possibility of such an occurrence is precluded by provision of the control circuit 40, which senses the position of each pack 6 in the channel 12 during its passage under the hole 33 in the pressure plate 32 and compares it with the position that ought to register, in theory, if the pack 6 is to locate faultlessly in the relative window 17 on reaching the exit end of the conveyor. In the event of there being a difference between the effective and theoretical positions thus described, relative to a given pack 6, the control circuit 40 will cut in by way of the stepping motor 38 and the differential 37 to adjust the indexing motion of the conveyor 5, eliminating the positional error and thus ensuring that the pack 6 locates faultlessly in the relative window 17.

Figure 4:
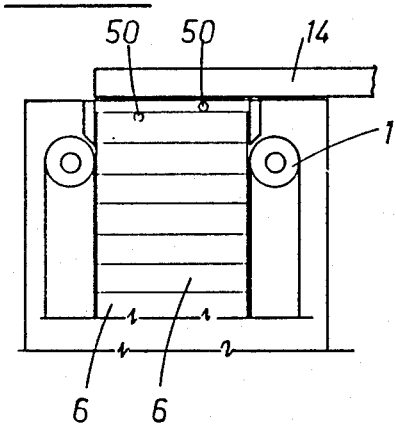
FIG. 4 illustrates an alternative embodiment of the detection means.

Clearly enough, the detection means 35 might equally well be of a type other than that described above, for example inductive, capacitive or optical rather than pneumatic, and furthermore, might be installed in a position other than that illustrated, say, at the exit end of the channel 12. More exactly, the detection means 35 might consist in a pair of inductive transducers 50 (see FIG. 4) mounted to the table 4 supporting the packs 6 in such a way as to coincide with the exit end of the channel 12. Two such transducers would be disposed side by side, offset from one another in relation to a vertical plane lying transverse to the path followed by the packs 6, in such a way as to monitor three different configurations:

correct positioning of the pack as it approaches the transfer wheel 14: the first transducer encountered responds to the presence of the edge of the pack nearest the wheel 14; the second transducer produces no response;

pack approach position retarded: neither transducer 50 responds;

pack approach position too far advanced: early exit of the pack from the channel 12 triggers response from both transducers 50.

Where the approach position is incorrect, as in the second and third instances, the detection means 35 respond as already described, relaying an output signal to the conversion transducer 41 of the control circuit 40, the operation of which remains the same as before.

Optimum usefulness of the detection means 35 will be ensured by enabling their operation subject to a signal confirming the presence of a pack 6 in the previously indexed window of the transfer wheel—i.e. that currently occupying the quality control station 25 next in line after the packs are picked up from the exit of the channel 12.

What is claimed:

1. An exit stage device for a packaging line, in particular a line for the manufacture of packs of cigarettes, comprising:

a conveyor in receipt of a file of packs which it indexes forward along a predetermined path, sandwiched side by side substantially in mutual contact one with the next;

transfer means located at the exit end of the conveyor, designed to remove the packs from the conveyor singly and in regular succession, shifting them in a direction transverse to that of the path established by the conveyor, and consisting in a transfer wheel that exhibits a plurality of peripheral pockets, each one of which designed to accommodate a respective pack, and is rotatable about an axis lying substantially parallel with the path established by the conveyor in such a way that the peripheral pockets can be indexed successively into alignment with the exit end of the path established by the conveyor;

drive means for operation of the conveyor and the transfer means;

means for detection of the exact position occupied by each pack in relation to the transfer wheel on arrival at a reference point situated along the path established by the conveyor;

a differential, installed between the conveyor and the drive means and having a first input and a second input, the first connected to the drive means, the second connected to a motor which is operated by the detection means through the agency of a control circuit.

2. A device as in claim 1, wherein the motor is an electric stepping motor.

3. A device as in claim 1, wherein the detection means consist in a pair of inductive transducers located at the point of exit from the predetermined path, offset one from the other in relation to a vertical plane lying transverse to the direction of movement of the packs.

4. A device as in claim 1, further comprising a plurality of work stations located along the periphery of the transfer wheel and including quality control stations, each of which serves to monitor a given characteristic of the single packs.

5. A device as in claim 4, wherein the work stations also include a transfer station at which the packs are removed from the pockets, and a reject station at which defective packs are knocked out.

6. An exit stage device for a packaging line, in particular a line for the manufacture of packs of cigarettes, comprising:

a conveyor in receipt of a file of packs which it indexes forward along a predetermined path, sandwiched side by side substantially in mutual contact one with the next;

transfer means located at the exit end of the conveyor, designed to remove the packs from the conveyor singly and in regular succession, shifting them in a direction transverse to that of the path established by the conveyor, and consisting in a transfer wheel that exhibits a plurality of peripheral pockets, each one of which designed to accommodate a respective pack, and is rotatable about an axis lying substantially parallel with the path established by the conveyor in such a way that the peripheral pockets can be indexed successively into alignment with the exit end of the path established by the conveyor;

drive means for operation of the conveyor and the transfer means;

pneumatic means for detection of the exact position occupied by each pack in relation to the transfer wheel on arrival at a reference point situated along the path established by the conveyor;

a differential, installed between the conveyor and the drive means and having a first input and a second input, the first connected to the drive means, the second connected to a motor which is operated by the pneumatic detection means through the agency of a control circuit.

7. A device as in claim 6, wherein the detection means are pneumatic, comprising a nozzle located at the reference point on the established path and facing the file of packs, and operate by directing a continuous jet of fluid through the nozzle at the file of packs and measuring the rebound pressure created by collision of the jet with the pack or packs occupying the reference point, which registers at peak value whenever a single pack is centered on the reference point.

8. A device as in claim 6, wherein the control circuit comprises a generator governed by the drive means and designed to emit a first timing signal, a sensor connected to the detection means and designed to emit a second timing signal, and a comparator in receipt of the first and second timing signals, the electrical output signal from which is proportional both in absolute value and in plus or minus status to the difference between the two timing signals and serves to control the motor.

* * * * *